(12) United States Patent
Woodman et al.

(10) Patent No.: US 12,047,196 B2
(45) Date of Patent: Jul. 23, 2024

(54) CONTROL SYSTEM ARCHITECTURE FOR ATMOSPHERIC SUIT

(71) Applicant: Hamilton Sundstrand Corporation, Charlotte, NC (US)

(72) Inventors: Darren Woodman, North Granby, CT (US); Anders Walker, Marion, IA (US); Gregory John Quinn, Windsor, CT (US); Don Pedersen, League City, TX (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 299 days.

(21) Appl. No.: 17/552,465

(22) Filed: Dec. 16, 2021

(65) Prior Publication Data

US 2023/0179442 A1   Jun. 8, 2023

Related U.S. Application Data

(60) Provisional application No. 63/287,323, filed on Dec. 8, 2021.

(51) Int. Cl.
*H04L 12/40* (2006.01)
*B64G 6/00* (2006.01)
*H04L 67/12* (2022.01)

(52) U.S. Cl.
CPC .............. *H04L 12/40* (2013.01); *B64G 6/00* (2013.01); *H04L 67/12* (2013.01); *H04L 2012/40215* (2013.01)

(58) Field of Classification Search
CPC ............ H04L 12/40; H04L 67/12; H04L 2012/40215; B64G 6/00
See application file for complete search history.

(56) References Cited

U.S. PATENT DOCUMENTS 6,681,589 B2   1/2004 Brudnicki
11,159,881 B1  10/2021 Rohrig
(Continued)

FOREIGN PATENT DOCUMENTS

CN   106776435 A   5/2017
EP     4026579 A1  7/2022

OTHER PUBLICATIONS

Abstract for CN106776435, Published: May 31, 2017, 1 page.
(Continued)

*Primary Examiner* — Behrang Badii
*Assistant Examiner* — Jay Khandpur
(74) *Attorney, Agent, or Firm* — CANTOR COLBURN LLP

(57) ABSTRACT

A control system in an atmospheric suit includes a broadcast-type controller area network (CAN) bus and a plurality of motor controllers coupled to the CAN bus. Each of the plurality of motor controllers has a same software design and performs a different control operation based on an assigned hardware address. The control system also includes one or more sensors to sense one or more parameter values in the atmospheric suit and to provide the one or more parameter values on the CAN bus. A primary controller communicates with the plurality of motor controllers via the CAN bus and provides communication to a wearer of the atmospheric suit or communication outside the atmospheric suit outside the CAN bus.

18 Claims, 2 Drawing Sheets

(56) References Cited

U.S. PATENT DOCUMENTS

| | | | |
|---|---|---|---|
| 2017/0239816 A1* | 8/2017 | Loughran | G05D 1/0022 |
| 2017/0344028 A1* | 11/2017 | Westermo | H04L 67/125 |
| 2019/0154439 A1* | 5/2019 | Binder | G01B 11/26 |
| 2019/0258239 A1* | 8/2019 | Floreano | A63H 30/04 |
| 2020/0086849 A1* | 3/2020 | Colavincenzo | B60L 1/02 |
| 2020/0209085 A1* | 7/2020 | Wettels | B25J 13/084 |
| 2021/0061500 A1 | 3/2021 | Barnes et al. | |
| 2021/0155353 A1 | 5/2021 | Miller | |
| 2021/0250667 A1 | 8/2021 | Rampone et al. | |
| 2021/0291486 A1* | 9/2021 | Wagner | B32B 5/026 |
| 2021/0405618 A1* | 12/2021 | Karhinen | G05B 19/0428 |

OTHER PUBLICATIONS

Ambrose et al. "Robonaut: The 'Short List' of Technology Hurdles", IEEE Computer Society, IEEE, USA, vol. 38, No. 1, Jan. 1, 20005, pp. 28-37.

EP Search report for Application No. 22211231.0, mailed May 8, 2023, 11 pages.

Hoffman, Stephen J., "Advanced EVA Capabilities: A Study for NASA's Revolutionary Aerospace Systems Concept Program", NASA/TP, Apr. 1, 2004, pp. 1-174, retrieved from the Internet: https://ston.jsc.nasa.gov/collections/trs/_techrep/TP-2004-212068.pdf.

* cited by examiner

CONTROL SYSTEM ARCHITECTURE FOR ATMOSPHERIC SUIT

CROSS-REFERENCE TO RELATED APPLICATIONS

This application claims the benefit of U.S. Provisional Application No. 63/287,323 filed Dec. 8, 2021, the disclosure of which is incorporated herein by reference in its entirety.

BACKGROUND

Exemplary embodiments pertain to the art of atmospheric suits and, in particular, to a control system architecture for an atmospheric suit.

In some environments and applications, an atmospheric suit is used not only for protection against impacts but also to maintain a habitable environment. In a space application, for example, an extravehicular mobility unit (EMU), which includes a helmet and full body suit supplied by an oxygen tank, maintains an environment that sustains the astronaut. Sensor-based control is used to maintain the environment in the EMU.

BRIEF DESCRIPTION

In one exemplary embodiment, a control system in an atmospheric suit includes a broadcast-type controller area network (CAN) bus and a plurality of motor controllers coupled to the CAN bus. Each of the plurality of motor controllers has a same software design and performs a different control operation based on an assigned hardware address. The control system also includes one or more sensors to sense one or more parameter values in the atmospheric suit and to provide the one or more parameter values on the CAN bus. A primary controller communicates with the plurality of motor controllers via the CAN bus and provides communication to a wearer of the atmospheric suit or communication outside the atmospheric suit outside the CAN bus.

In addition to one or more of the features described herein, the primary controller supervises each of the plurality of motor controllers and commands each of the plurality of motor controllers to implement the control operation based on one or more of the one or more parameter values from one or more of the one or more sensors.

In addition to one or more of the features described herein, the primary controller detects a fault in one of the plurality of motor controllers based on a failure to receive a confirmation from the one of the plurality of motor controllers in response to the command or based on a subsequent one of the one or more parameter values.

In addition to one or more of the features described herein, the primary controller issues an alert based on detecting the fault in the one of the plurality of motor controllers.

In addition to one or more of the features described herein, the plurality of motor controllers periodically receives a health signal from the primary controller.

In addition to one or more of the features described herein, the plurality of motor controllers detects a fault in the primary controller based on a failure to receive the health signal and implements the control operation based on the one or more of the one or more parameter values from the one or more of the one or more sensors independently, based on detecting the fault in the primary controller.

In addition to one or more of the features described herein, the plurality of motor controllers detects a fault in the CAN bus.

In addition to one or more of the features described herein, the plurality of motor controllers operates independently in a sensor-free mode in which the control operation of each of the plurality of motor controllers does not rely on any parameter value from any sensor.

In addition to one or more of the features described herein, based on a fault in one of the one or more sensors, one of the plurality of motor controllers that implements the control operation based on one or more of the one or more parameter values from the one of the one or more sensors operates in a sensor-free mode in which the control operation does not rely on the one or more of the one or more parameter values.

In addition to one or more of the features described herein, others of the plurality of motor controllers that implement the control operation without relying on the one or more parameter values from the one of the one or more sensors with the fault continue normal operation.

In addition to one or more of the features described herein, the atmospheric suit is an extravehicular mobility unit (EMU) for use in a space environment and the control system controls a primary life support system of the EMU.

In another exemplary embodiment, a method of assembling a control system in an atmospheric suit includes arranging a broadcast-type controller area network (CAN) bus and coupling a plurality of motor controllers to the CAN bus. Each of the plurality of motor controllers has a same software design and performs a different control operation based on an assigned hardware address. The method also includes arranging one or more sensors to sense one or more parameter values in the atmospheric suit and to provide the one or more parameter values on the CAN bus. A primary controller communicates with the plurality of motor controllers via the CAN bus and provides communication to a wearer of the atmospheric suit or communication outside the atmospheric suit outside the CAN bus.

In addition to one or more of the features described herein, the configuring the primary controller includes the primary controller supervising each of the plurality of motor controllers and commanding each of the plurality of motor controllers to implement the control operation based on one or more of the one or more parameter values from one or more of the one or more sensors.

In addition to one or more of the features described herein, the configuring the primary controller includes the primary controller detecting a fault in one of the plurality of motor controllers based on a failure to receive a confirmation from the one of the plurality of motor controllers in response to the command or based on a subsequent one of the one or more parameter values.

In addition to one or more of the features described herein, the configuring the primary controller includes the primary controller issuing an alert based on detecting the fault in the one of the plurality of motor controllers.

In addition to one or more of the features described herein, the method also includes configuring each of the plurality of motor controllers to periodically receive a health signal from the primary controller.

In addition to one or more of the features described herein, the configuring the plurality of motor controllers includes the plurality of motor controllers identifying a fault in the primary controller based on a failure to receive the health signal and implementing the control operation based on the one or more of the one or more parameter values from the one or more of the one or more sensors independently, based on identifying the fault in the primary controller.

In addition to one or more of the features described herein, the configuring the plurality of motor controllers includes the plurality of motor controllers identifying a fault in the CAN bus.

In addition to one or more of the features described herein, the configuring the plurality of motor controllers includes the plurality of motor controllers operating independently in a sensor-free mode in which the control operation of each of the plurality of motor controllers does not rely on any parameter value from any sensor.

In addition to one or more of the features described herein, based on a fault in one of the one or more sensors, configuring the plurality of motor controllers such that one of the plurality of motor controllers that implements the control operation based on one or more of the one or more parameter values from the one of the one or more sensors operates in a sensor-free mode in which the control operation does not rely on the one or more of the one or more parameter values and others of the plurality of motor controllers implement the control operation without relying on the one or more parameter values from the one of the one or more sensors with the fault continue normal operation.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, an atmospheric suit maintains a habitable environment for the wearer in different applications. In the exemplary space application, the atmospheric suit may be an EMU. As also noted, sensor-based control is used to maintain the environment. As mission durations and distance from safe harbor (e.g., space vehicle) increase, the ability to maintain the habitable environment in the atmospheric suit reliably, over longer periods becomes increasingly important. Defects of one or more devices is more likely over longer missions and, thus, a robust fault tolerant architecture is needed.

Embodiments of the systems and methods detailed herein relate to a control system architecture for an atmospheric suit. The control system discussed for explanatory purposes pertains to the life support system. The architecture includes a set of motor controllers, a primary controller, and sensors that communicate over a controller area network (CAN) bus. The CAN bus is a known broadcast-type serial communication bus (i.e., all nodes on the bus hear every communication on the bus). Each of the motor controllers may be identical (i.e., same hardware and software), with the function of each being defined by a hardware address. As such, the motor controllers may be repurposed, as needed, and software development and qualification is made easier. Further, obtaining radiation hardened components, which are needed in the space environment, and spare motor controllers is vastly simplified. Based on the use of the CAN bus, communication from each motor controller and the primary controller, as well as data from every sensor is universally available (i.e., accessible to any motor controller or the primary controller). This facilitates supervision by the primary controller and monitoring of the health of the primary controller by each of the motor controllers. In addition, the CAN bus makes the addition of nodes (e.g., sensors, motor controllers) straight-forward.

Figure 1:
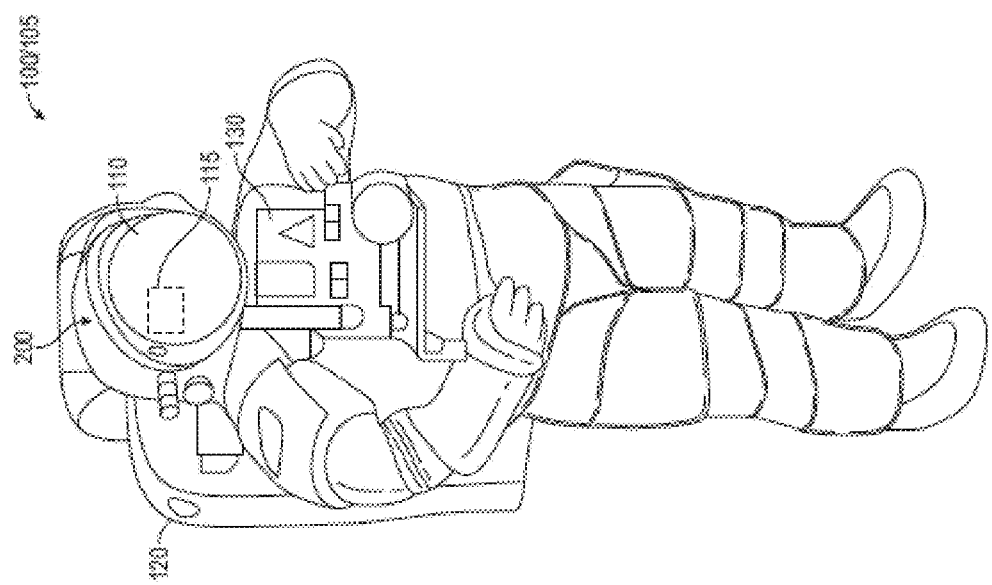
FIG. 1 shows an atmospheric suit that includes the control system architecture according to one or more embodiments.

FIG. 1 shows an atmospheric suit 100 that includes the control system architecture according to one or more embodiments. The exemplary atmospheric suit 100 shown in FIG. 1 is an EMU 105. While an EMU and a space application are specifically discussed for explanatory purposes, applications for the controller system architecture according to one or more embodiments may also include underwater (e.g., in an atmospheric diving suit), earth-based (e.g., in a hazmat suit or contamination suit), high-altitude (e.g., in a flight suit), and sub-surface environments. Generally, any suit that includes the helmet to maintain a habitable environment is referred to as an atmospheric suit.

Figure 2:
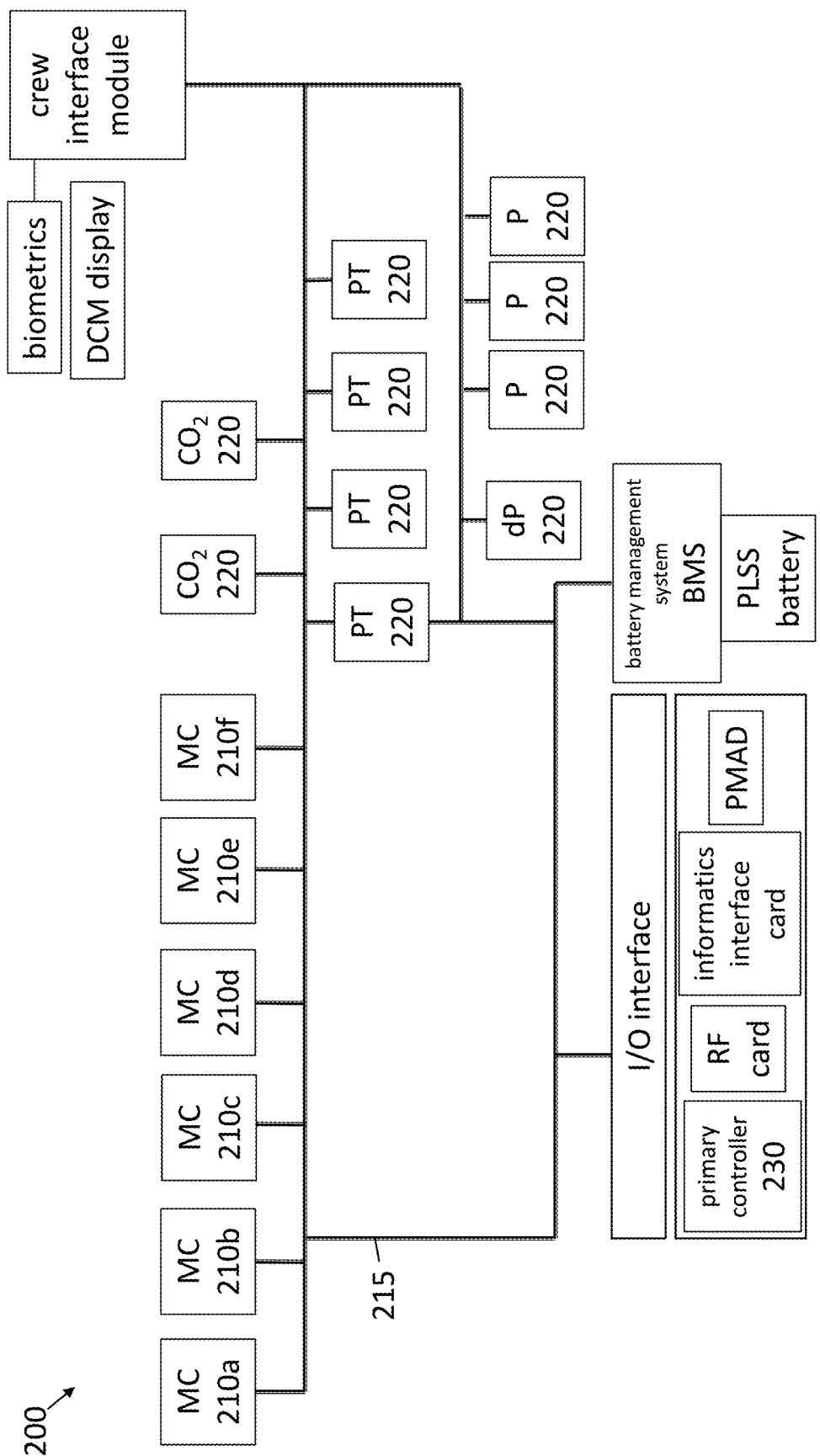
FIG. 2 is a schematic diagram of an exemplary control system for an atmospheric suit with an architecture according to one or more embodiments.

The EMU 105 includes a helmet 110, shown with an optional in-helmet display 115. Systems that are affixed as part of the EMU 105 include a primary life support system (PLSS) 120 and a display and control module (DCM) 130. These systems 120, 130, along with components of the EMU 105, create a habitable environment for a wearer performing extravehicular activity in space. As detailed with reference to FIG. 2, the control system architecture, according to one or more embodiments, defines the structure and behavior of components that control operation of the PLSS 120 and DCM 130 to maintain the environment in the EMU FIG. 2 is a schematic diagram of an exemplary control system 200 for an atmospheric suit 100 that has an architecture according to one or more embodiments. The control system 200 is used for explanatory purposes but is not intended to limit every control system 200 that may be assembled using the architecture according to one or more embodiments. According to the alternate embodiments, the structure and behavior defined by the architecture may result in other control systems 200. The structure includes multiple motor controllers 210 that may have identical designs but are instantiated for different functions, a primary controller 230, and sensors 220 that communicate over a CAN bus 215. The primary controller 230 may be a field programmable gate array (FPGA). As detailed, this structure facilitates two-fault tolerant behavior and a number of operational scenarios. In addition, the architecture facilitates simplified reprogramming and updating via software updates to the motor controllers 210 and updates to the code of the FPGA-based primary controller 230.

The exemplary control system 200 shown in FIG. 2 includes six motor controllers 210a through 210f (generally referred to as 210) that control various aspects of the PLSS 120 functionality (i.e., different PLSS subsystems). As previously noted, the motor controllers 210a through 210f may include the same software design but each may serve a different function (i.e., implement a different control operation on a different subsystem). The function is defined by a hardware addressing identifier that is established during setup and that may be modified between extravehicular missions. That is, for example, the function that was served (i.e., control operation that was implemented) by the motor controller 210a (i.e., a given physical device) during one extravehicular mission may be served by another, such as a spare motor controller 210 or a repurposed motor controller 210e, for example, in a subsequent extravehicular mission. For explanatory purposes, exemplary control operations assigned to each of the motor controllers (MC) 210a through 210f are summarized in Table 1.

TABLE 1

Control operation associated with each motor controller 210.

| | subsystem | control operation |
|---|---|---|
| MC 210a | rapid cycle amine (RCA) system | adjust valve to switch out amine beds |
| MC 210b | space suit water membrane evaporator (SWME) | adjust orifice to adjust moisture absorption from within the atmospheric suit |
| MC 210c | variable speed fan | adjust fan speed to control oxygen circulation within the atmospheric suit |
| MC 210d | control coolant recirculation pumps | adjust value to control coolant recirculation pumps |
| MC 210e | redundant control of coolant recirculation pumps | redundant control of valve to control coolant recirculation pumps |
| MC 210f | primary oxygen regulator | adjust valve to modulate pressure on pressure regulator card |

As previously noted, the exemplary motor controllers 210 do not limit alternate arrangements. For example, one or more control operations may be further subdivided for control by two or more motor controllers 210. As an additional example, a redundant motor controller 210 may be included for one or more of the control operations.

One or more of the control operations may be based on data from one or more sensors 220. For example, motor controller 210a may use a carbon dioxide ($CO_2$) measurement from the carbon dioxide sensor 220. Other sensors shown in FIG. 2 include pressure and temperature (PT) sensors 220, a differential pressure (dP) sensor 220, and pressure (P) sensors 220. For example, one or more of the pressure and temperature (PT) sensors 220 may obtain pressure and temperature of the wearer of the atmospheric suit 100 to provide biometrics while one or more other pressure and temperature (PT) sensors 220 may obtain pressure and temperature of the atmosphere within the atmospheric suit 100. Data from all of the sensors 220 is available to any of the motor controllers 210 and to the primary controller 230 over the CAN bus 215. A power bus may be arranged in parallel with the CAN bus 215 to supply power to each of the devices.

In addition to data from the sensors 220, information from other devices may also be available over the CAN bus 215. For example, the battery management system (BMS) that monitors the health of the PLSS battery may provide information over the CAN bus 215. Communication to or from the wearer of the atmospheric suit 100 may be transmitted over the CAN bus 215, as well. The wearer may control knobs on the panel of the DCM 130 to provide input while a message to the wearer (e.g., an alert) may be provided on a display of the DCM 130. An input/output (I/O) interface is shown to facilitate communication over the CAN bus 215 by devices that may be packaged together in a chassis. These devices include the primary controller 230, a radio frequency (RF) card, an informatics interface card, and a power management and distribution (PMAD) device.

The structure defined by the architecture allows operation under several different scenarios. For example, a non-faulted scenario may involve the primary controller 230 taking a supervisory role over operations of the motor controllers 210. According to this scenario, the primary controller 230 may monitor data from every sensor 220 while each motor controller 210 monitors data from one or more relevant sensors 220 even though data from every sensor 220 is available over the CAN bus 215. The primary controller 230 may then provide commands to each of the motor controllers 210, as needed, to implement the control operations.

For example, the motor controller 210a may only monitor the $CO_2$ level. When the $CO_2$ level indicates that the amine bed currently in use by the RCA system is saturated (e.g., $CO_2$ level exceeds a threshold value), the primary controller 230 may send a command to the motor controller 210a over the CAN bus 215 to initiate an amine bed switch. In response, the motor controller 210a may activate the switching process and also provide confirmation to the primary controller 230. The primary controller 230 may provide status or other information to the wearer of the atmospheric suit 100 (e.g., via the DCM display) or to a monitoring station or the space vehicle (e.g., via the RF card) based on the confirmation.

Based on the architecture, health monitoring and failure prediction and mitigation may be facilitated. According to exemplary embodiments, as part of the normal operating mode, the primary controller 230 may also store performance data during each use (e.g., each extravehicular activity). For example, the primary controller 230 may include a nonvolatile memory device to store high fidelity data indicating performance (e.g., of the motor controllers 210, sensors 220). The data may be analyzed between missions to perform prognostic health monitoring, for example. That is, the data may be compared with baseline data to identify or predict failure in a motor controller 210 or sensor 220.

One exemplary fault scenario involves failure of the primary controller 230. The primary controller 230 may provide a health indication over the CAN bus 215 (e.g., a periodic signal) that is available to all of the motor controllers 210. When the motor controllers 210 determine that the CAN bus 215 has not failed (e.g., data from the sensors 220 is still available on the CAN bus 215) but the health indication from the primary controller 230 is not available, they may determine that the primary controller 230 has failed. In this case, each of the motor controllers 210 may proceed with their corresponding control operations in an unsupervised manner. Thus, for example, based on the $CO_2$ level exceeding the threshold, the motor controller 210a may initiate the switching operation of the amine beds of the RCA without a command from the primary controller 230.

An alternate or additional (i.e., two-fault) scenario involves failure of the CAN bus 215. Each of the motor controllers 210 may determine that the CAN bus 215 has failed based on the lack of any communication (e.g., sensor data, commands) on the CAN bus 215. In this case, data from sensors 220 is unavailable, in addition to commands from the primary controller 230. Each of the motor controllers 210 may operate in a data-free mode that does not depend on data. For example, the motor controller 210a may initiate a switch of the amine beds of the RCA system periodically (e.g., every 3 minutes) rather than on the basis of a $CO_2$ level provided by a sensor 220.

According to yet another scenario that is facilitated by the architecture according to one or more embodiments, failure of sensor 220 may cause one or more of the motor controllers 210 to operate in the data-free mode. That is, even while the primary controller 230 and CAN bus 215 are operational, one or more of the sensors 220 may stop providing data over the CAN bus 215. In this case, only the affected motor controllers 210 need to operate in a data-free mode that does not rely on data. The effected motor controllers 210 may be directed to start operation in the data-free mode by the primary controller 230. For example, if only the sensor 220 that provides differential pressure (dP) fails, the motor controller 210a that controls the RCA system based on data from the $CO_2$ sensor 220 may still operate in the normal mode.

According to an exemplary embodiment, the primary controller 230 may detect a fault in one or more of the motor controllers 210. The fault may be detected based on a failure of the motor controller 210 to provide a confirmation in response to a command, for example. In this case, the primary controller 230 may provide an alert to the wearer of the atmospheric suit 100 via the display of the DCM 130. The primary controller 230 may additionally or alternately transmit an alert to a monitoring center or the space vehicle or habitat via the RF card. Based on the control operation being performed by the failed motor controller 210, the alert from the primary controller 230 may indicate that the wearer of the atmospheric suit 100 must return to the space vehicle or habitat immediately.

The scenarios discussed explicitly are only exemplary, and other scenarios are also possible with the architecture. For example, the primary controller 230 may provide redundancy for each of the motor controllers 210 and may take over the functionality of a failed motor controller 210. In the exemplary case of the primary controller 230 commanding the motor controller 210a to initiate a switch of the amine beds of the RCA system, the lack of a confirmation from the motor controller 210a or a confirmation that is not followed by an expected drop in the $CO_2$ level subsequently indicated by the sensor 220 may indicate that the motor controller 210a has failed. The primary controller 230 may perform the control operation assigned to eh motor controller 210a in this case.

In the case of redundant functionality in the primary controller 230, a designation may be made of whether the primary controller 230 or each motor controller 210 operates in the data-free mode based on a failure of the CAN bus 215 to prevent both the primary controller 230 and each of the motor controllers 210 from attempting to perform data-free control on each of the systems. Because the architecture facilitates access to all communication on the CAN bus 215 by every device (e.g., every motor controller 210, primary controller 230), fault tolerance or redundancy may be established in a number of ways. That is, the architecture defined by the multiple motor controllers 210, primary controller 230, and sensors 220 on a broadcast-type bus (e.g., CAN bus) offers a robust and flexible solution to withstand faults in one or more of the devices.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A control system in an atmospheric suit, the control system comprising:
    a broadcast-type controller area network (CAN) bus;
    a plurality of motor controllers coupled to the CAN bus, each of the plurality of motor controllers having a same software design and being configured to perform a different control operation based on an assigned hardware address;
    one or more sensors configured to sense one or more parameter values in the atmospheric suit and to provide the one or more parameter values on the CAN bus; and
    a primary controller configured to communicate with the plurality of motor controllers via the CAN bus and to provide communication to a wearer of the atmospheric suit or communication outside the atmospheric suit outside the CAN bus;
    wherein, based on a fault in one of the one or more sensors, one of the plurality of motor controllers that implements the control operation based on one or more of the one or more parameter values from the one of the one or more sensors is configured to operate in a sensor-free mode in which the control operation does not rely on the one or more of the one or more parameter values.

2. The control system according to claim 1, wherein the primary controller is configured to supervise each of the plurality of motor controllers and command each of the plurality of motor controllers to implement the control operation based on one or more of the one or more parameter values from one or more of the one or more sensors.

3. The control system according to claim 2, wherein the primary controller is configured to detect a fault in one of the plurality of motor controllers based on a failure to receive a confirmation from the one of the plurality of motor controllers in response to the command or based on a subsequent one of the one or more parameter values.

4. The control system according to claim 3, wherein the primary controller is configured to issue an alert based on detecting the fault in the one of the plurality of motor controllers.

5. The control system according to claim 2, wherein the plurality of motor controllers is configured to periodically receive a health signal from the primary controller.

6. The control system according to claim 5, wherein the plurality of motor controllers is configured to detect a fault in the primary controller based on a failure to receive the health signal and to implement the control operation based on the one or more of the one or more parameter values from the one or more of the one or more sensors independently, based on detecting the fault in the primary controller.

7. The control system according to claim 1, wherein the plurality of motor controllers is configured to detect a fault in the CAN bus.

8. The control system according to claim 7, wherein the plurality of motor controllers is configured to operate independently in a sensor-free mode in which the control operation of each of the plurality of motor controllers does not rely on any parameter value from any sensor.

9. The control system according to claim 1, wherein others of the plurality of motor controllers that implement the control operation without relying on the one or more parameter values from the one of the one or more sensors with the fault are configured to continue normal operation.

10. The control system according to claim 1, wherein the atmospheric suit is an extravehicular mobility unit (EMU) for use in a space environment and the control system controls a primary life support system of the EMU.

11. A method of assembling a control system in an atmospheric suit, the method comprising:
   arranging a broadcast-type controller area network (CAN) bus;
   coupling a plurality of motor controllers to the CAN bus, each of the plurality of motor controllers having a same software design and being configured to perform a different control operation based on an assigned hardware address;
   arranging one or more sensors to sense one or more parameter values in the atmospheric suit and to provide the one or more parameter values on the CAN bus; and
   configuring a primary controller to communicate with the plurality of motor controllers via the CAN bus and to provide communication to a wearer of the atmospheric suit or communication outside the atmospheric suit outside the CAN bus;
   wherein the configuring the plurality of motor controllers includes the plurality of motor controllers identifying a fault in the CAN bus; and
   wherein the configuring the plurality of motor controllers includes the plurality of motor controllers operating independently in a sensor-free mode in which the control operation of each of the plurality of motor controllers does not rely on any parameter value from any sensor.

12. The method according to claim 11, wherein the configuring the primary controller includes the primary controller supervising each of the plurality of motor controllers and commanding each of the plurality of motor controllers to implement the control operation based on one or more of the one or more parameter values from one or more of the one or more sensors.

13. The method according to claim 12, wherein the configuring the primary controller includes the primary controller detecting a fault in one of the plurality of motor controllers based on a failure to receive a confirmation from the one of the plurality of motor controllers in response to the command or based on a subsequent one of the one or more parameter values.

14. The method according to claim 13, wherein the configuring the primary controller includes the primary controller issuing an alert based on detecting the fault in the one of the plurality of motor controllers.

15. The method according to claim 12, further comprising configuring each of the plurality of motor controllers to periodically receive a health signal from the primary controller.

16. The method according to claim 15, wherein the configuring the plurality of motor controllers includes the plurality of motor controllers identifying a fault in the primary controller based on a failure to receive the health signal and implementing the control operation based on the one or more of the one or more parameter values from the one or more of the one or more sensors independently, based on identifying the fault in the primary controller.

17. A method of assembling a control system in an atmospheric suit, the method comprising:
   arranging a broadcast-type controller area network (CAN) bus;
   coupling a plurality of motor controllers to the CAN bus, each of the plurality of motor controllers having a same software design and being configured to perform a different control operation based on an assigned hardware address;
   arranging one or more sensors to sense one or more parameter values in the atmospheric suit and to provide the one or more parameter values on the CAN bus; and
   configuring a primary controller to communicate with the plurality of motor controllers via the CAN bus and to provide communication to a wearer of the atmospheric suit or communication outside the atmospheric suit outside the CAN bus;
   wherein, based on a fault in one of the one or more sensors, configuring the plurality of motor controllers such that one of the plurality of motor controllers that implements the control operation based on one or more of the one or more parameter values from the one of the one or more sensors operates in a sensor-free mode in which the control operation does not rely on the one or more of the one or more parameter values and others of the plurality of motor controllers implement the control operation without relying on the one or more parameter values from the one of the one or more sensors with the fault continue normal operation.

18. A control system in an atmospheric suit, the control system comprising:
   a broadcast-type controller area network (CAN) bus;
   a plurality of motor controllers coupled to the CAN bus, each of the plurality of motor controllers having a same software design and being configured to perform a different control operation based on an assigned hardware address;
   one or more sensors configured to sense one or more parameter values in the atmospheric suit and to provide the one or more parameter values on the CAN bus; and
   a primary controller configured to communicate with the plurality of motor controllers via the CAN bus and to provide communication to a wearer of the atmospheric suit or communication outside the atmospheric suit outside the CAN bus;
   wherein the plurality of motor controllers is configured to detect a fault in the CAN bus;
   wherein the plurality of motor controllers is configured to operate independently in a sensor-free mode in which the control operation of each of the plurality of motor controllers does not rely on any parameter value from any sensor.

* * * * *